United States Patent [19]
Stonemark

[11] Patent Number: 5,263,570
[45] Date of Patent: Nov. 23, 1993

[54] CONVEYOR BELT EMERGENCY STOP INDICATOR LIGHT SYSTEM

[75] Inventor: Wayne Stonemark, Sweetwater, Wyo.

[73] Assignee: General Chemical Corporation, Parsippany, N.J.

[21] Appl. No.: 939,292

[22] Filed: Aug. 31, 1992

[51] Int. Cl.$^5$ .............................................. B65G 43/00
[52] U.S. Cl. ................................ 198/502.1; 198/573
[58] Field of Search ............ 198/464.4, 502.1, 502.3, 198/502.4, 573

[56] References Cited

U.S. PATENT DOCUMENTS

| | | | |
|---|---|---|---|
| 1,444,775 | 2/1923 | Bennett | 198/502.4 |
| 1,574,914 | 3/1926 | McNamara | 198/502.1 |
| 1,659,316 | 2/1928 | Enney . | |
| 2,510,163 | 6/1950 | Wood | 198/502.4 |
| 2,589,220 | 3/1952 | Buckeridge | 198/502.1 |
| 2,645,330 | 7/1953 | Stephenson | 198/502.1 |
| 3,382,322 | 5/1968 | Duerden et al. | 198/502.1 |

*Primary Examiner*—Joseph E. Valenza
*Attorney, Agent, or Firm*—Arthur J. Plantamura

[57] ABSTRACT

A system and method is provided for expeditiously locating an emergency situation of a conveyor. An emergency switch is connected to a conveyor to indicate an emergency situation. When the emergency switch indicates an emergency situation, a light is illuminated by an indicator circuit. The indicator light system allows an emergency situation to be easily observed at a distance from the conveyor.

11 Claims, 6 Drawing Sheets

CONVEYOR BELT EMERGENCY STOP INDICATOR LIGHT SYSTEM

BACKGROUND OF THE INVENTION

1. Field of the Invention

The invention relates to an apparatus and method for a indicator light system used in connection with a conveyor apparatus for expeditiously finding the location of an emergency situation of the conveyor.

2. Description of the Prior Art

Conveyors are frequently used to carry ore from a location of a miner to a location outside of the mine. A typical mine can have between 10 to 20 miles of conveyor belts. Each of the conveyor belts is typically up to a mile in length. Usually, each conveyor belt is positioned in a single tunnel of the mine. Separate roadway tunnels are located parallel to the tunnels housing the conveyor belts. The roadway tunnels are used for travel by mine personnel either by walking or driving. Additional tunnels can be positioned perpendicular to the conveyor belt tunnels and the roadway tunnels for connecting the conveyor belt tunnels with the roadway tunnels.

In conventional conveyors, emergency switches are provided along the length of the conveyor. This switch stops the rotation of the conveyor belt in emergency situations. Emergency situations can include the ore bouncing off the belt, misalignment of the belt or deterioration of the belt. In an emergency situation, the emergency switch is tripped to stop the rotation of the belt around the conveyor rollers. A belt controller supplies diagnostic information to a diagnostic panel indicating that an emergency situation has occurred. However, the belt controller does not indicate which of the emergency switches has been tripped.

Once an emergency switch has been tripped, it is necessary to manually reset the tripped switch before rotation of the conveyor belt can be resumed. Typically, mining personnel manually determine when an emergency switch has been tripped by observing t he handle of the switch. When a switch is tripped, the handle of the switch moves 90 degrees from its original position. This method has the disadvantage that the position of the handle is difficult to see from a distance. Thus, the handle cannot be easily seen from the roadway tunnel. Further, there is no set standard for installing the emergency switches. Therefore, it is difficult to determine which position of the switch was the original position and which position of the switch indicates a fault.

In order to locate the tripped switch, mining personnel must walk the length of the conveyor belt to observe each switch in order to find the tripped switch. In the alternative, mining personnel can locate the tripped switch by driving the length of the belt in a vehicle in the roadway tunnel, stopping at each tunnel leading to a switch, getting out of the vehicle, walking to the switch and determining whether or not the switch was tripped. This method of manual checking the switches has the disadvantage of being time consuming to mining personnel. For example, it typically takes at least 45 minutes to an hour and a half to manually locate a tripped switch.

Another method for determining if an emergency switch has been tripped is through a central computer monitoring system. In this method, a computer control device is attached to each switch for monitoring the switch. A power supply is attached to each computer control device for powering the computer control device. The computer control device is also attached to a central monitor for displaying when a switch has been tripped. A typical central computer monitoring system is manufactured by Conspec. However, this method does not save time in resetting the emergency switches since once the computer indicates a tripped switch, the tripped switch still has to be manually reset by mining personnel. Further, the computer control system includes a separate power supply for each switch. Also, the costs for obtaining a central computer monitoring system are high.

The present invention is very economical and makes it possible to expeditiously provide a better indication of emergency situations in conveyors than is believed possible with prior art conveyors.

SUMMARY OF THE INVENTION

Briefly described, this present invention comprises a light indicator system for expeditiously finding the location of an emergency or to her problem of an operating conveyor. The conveyor includes emergency switches which are tripped during an emergency situation, i.e., ore falling off the belt. A light is illuminated when an emergency switch is tripped. The light can be readily observed by mining personal at a distance from the switch, thereby aiding mining personnel in determining and resetting the tripped switch.

Preferably, the indicator light system includes a pair of light emitting diodes mounted on either side of an integrated circuit board. A indicator circuit is activated when the emergency switch indicates an emergency situation. A bridge rectifier connects the indicator circuit to the emergency switch. Both the emergency switch and the light indicator system are powered by a conveyor belt controller. The indicator circuit is preferably positioned in the mining tunnel used for vehicle transportation.

DETAILED DESCRIPTION OF THE PREFERRED EMBODIMENT

Figure 1:
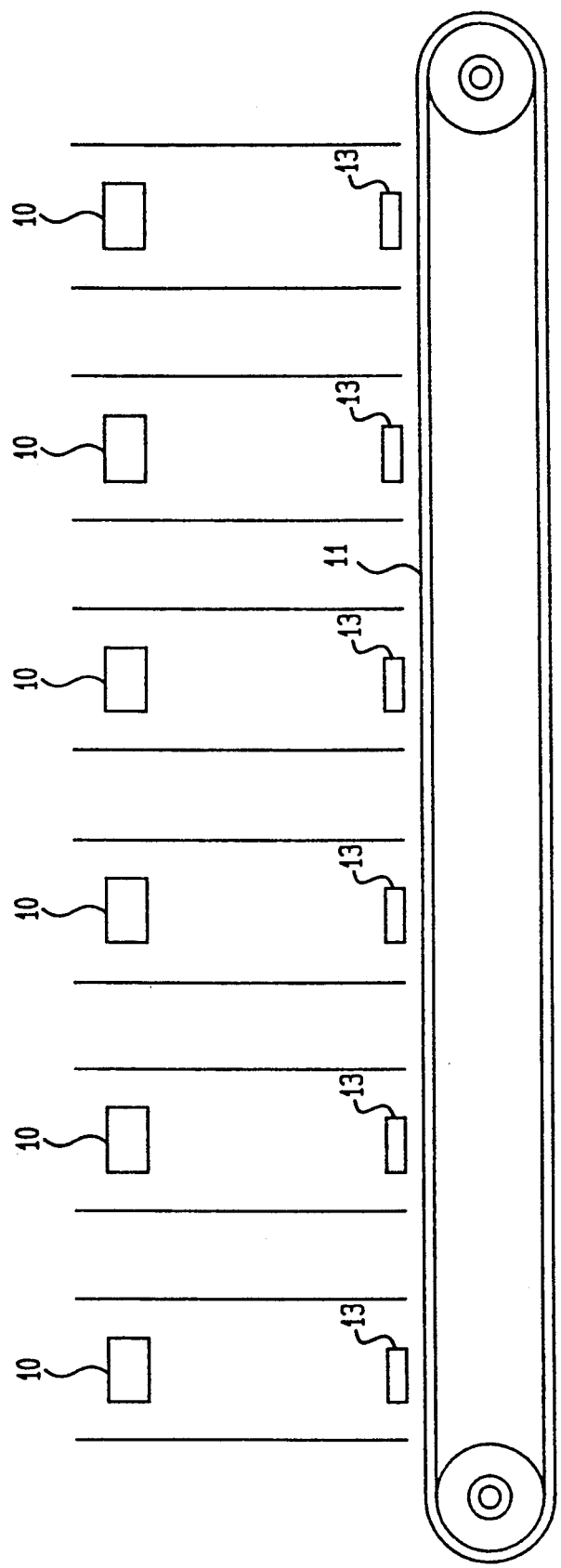
FIG. 1 is a side elevational view of a conveyor belt indicating the positioning of the indicator light system along the conveyor in accordance with the present invention.

During the course of the description like numbers will be used to identify like elements according to the different views which illustrate the invention. FIG. 1 illustrates a side elevational view of the location of indicator light system 10 along a conveyor 11. Each indicator light system 10 is disposed at a position relative to a respective emergency switch 13. A typical conveyor 11 is stationary and is about one mile long. Preferably indicator light system 10 is positioned about every 500 feet along the length of conveyor 11. Indicator light system 10 can also be positioned along a movable flexible train conveyor. An example of a conveyor which can be used in the practice of the present invention is a flexible train conveyor manufactured by Joy Technologies Inc., Franklin, Pa. as model no. 3FCT. It will be appreciated by those skilled in the art that other types of conveyors can be used and that indicator light system 10 can be positioned at various locations along the length of the conveyor.

Figure 2:
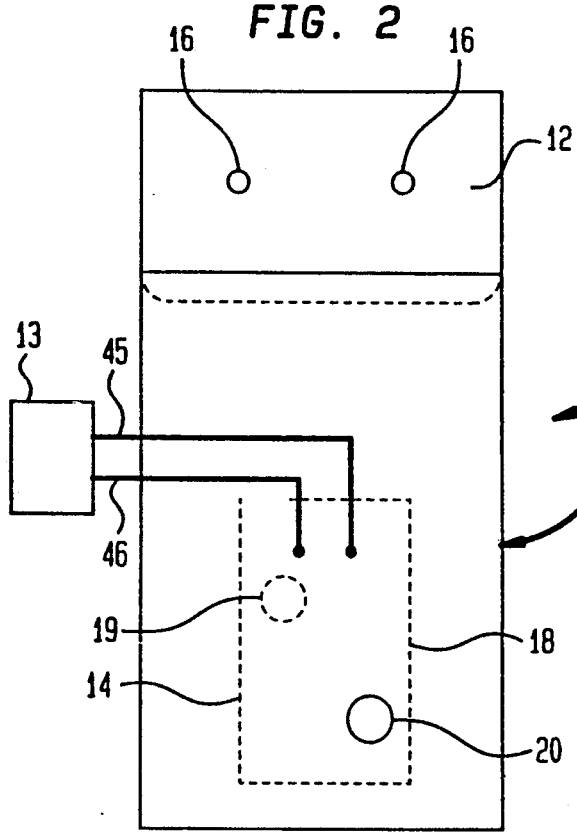
FIG. 2 is a front elevational view of the indicator light system in accordance with the present invention.

FIG. 2 illustrates a front view of indicator light system 10 used in practice of the present invention. In this embodiment, a pair of light emitting diodes (LED) 19, 20 are housed inside housing 17. Preferably, housing 17 is transparent to allow viewing of LEDs 19, 20. Most preferably housing 17 is formed of a one piece construction of ¼" thick plexiglass. In the alternative, housing 17 can be formed of individual pieces of plexiglass which are sealed together.

LEDs 19, 20 are mounted on integrated circuit board 18. Leads 45 and 46 are connected to emergency switch 13. A sealing compound 14 is used for mounting integrated circuit board 18 inside housing 17. Sealing compound 14 can also be applied around the edges of housing 17 for preventing dust and moisture from entering the inside of housing 17. Preferably sealing compound 14 is formed of a silicone. An example of a sealing compound which can be used is manufactured by 3-M as Southcast #2114.

Figure 3:
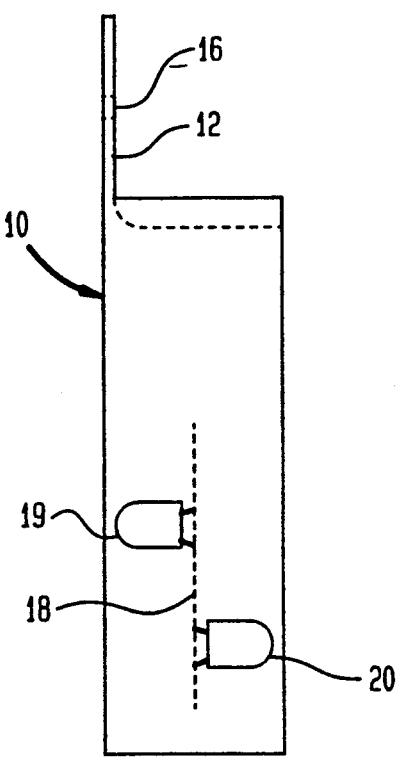
FIG. 3 is a side view of the indicator light system including the light emitting diodes in relation to the housing.

FIG. 3 illustrates a side elevational view of indicator light system 10. Back plate 12 extends upwardly from housing 17. Back plate 12 preferably extends about one to two inches above housing 17. Back plate 12 has a pair of holes 16 formed therein for mounting housing 17 to a wall of the mine. In the alternative, housing 17 can be mounted to a beam of the mine. A wire is fed through holes 16 and wrapped around the beam for mounting housing 17 to the beam or wall of the mine.

Figure 4:
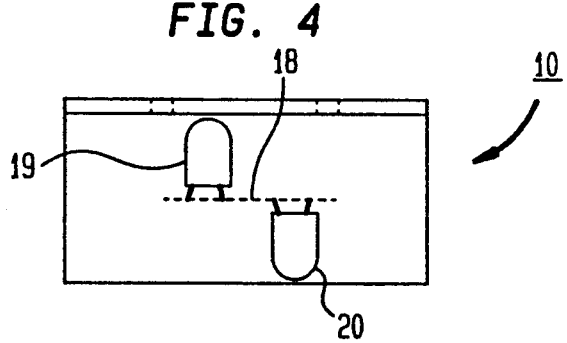
FIG. 4 is a top plan view of the indicator light system including the positioning of a pair of light emitting diodes.
Figure 5:
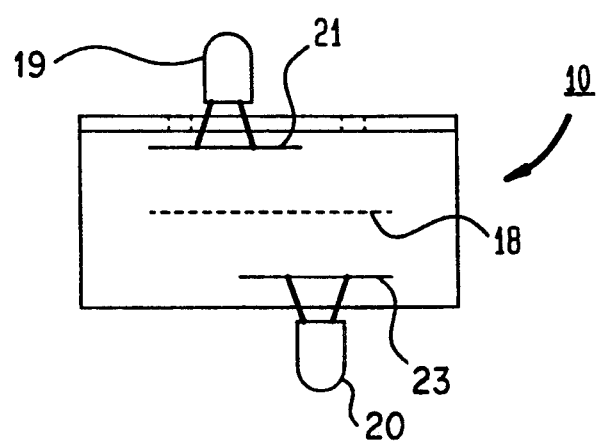
FIG. 5 is a top plan view of the indicator light system including the positioning of a pair of light emitting diodes through the housing in an alternate embodiment.

In the preferred embodiment LED 19 is positioned on one side of integrated circuit board 18 and LED 20 is positioned on the 10 other side of integrated circuit board 18, as shown in FIG. 4. An integrated circuit board useful for practice of this invention is manufactured by Radio Shack as Model No. 276-150. This positioning of LEDs 19, 20 allows the LEDs to be viewed from either side of housing 17. In the alternative, LEDs 19, 20 could protrude through housing 17 as shown in FIG. 5. In this embodiment LED 19 is mounted on integrated circuit board 21 and LED 20 is mounted on integrated circuit board 23. Indicator circuit 25 is mounted on an integrated circuit board. Integrated circuit board 8 is sandwiched between integrated circuit boards 21 and 23.

Figure 6:
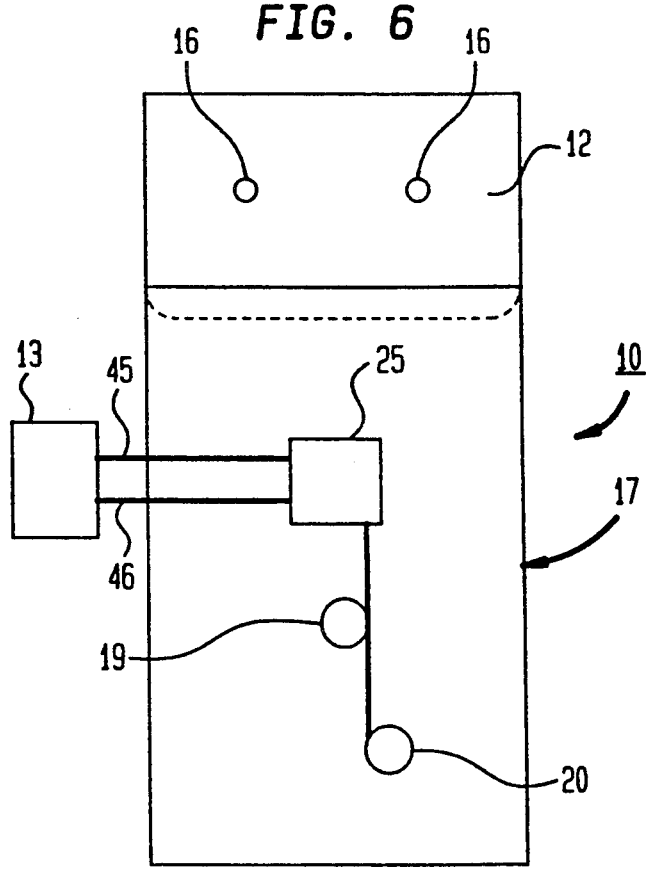
FIG. 6 is a front elevational view of the mounting of the indicator circuit and light emitting diodes in an alternate embodiment.

Alternatively, LEDS 19, 20 can be individually mounted inside housing 17 with a potting compound instead of being mounted on an integrated circuit board. In this embodiment, leads 45, 46 connect to respective LEDS 19, 20 as shown in FIG. 6. Indicator circuit 25 is also mounted with a potting compound inside housing 17.

Preferably, the range of light emitted from LEDs 19, 20 is at least about 200 mcd to about 2000 mcd. An illuminated LED 19, 20 can be seen at a distance of up to about 500 feet. Preferably, LEDs 19, 20 operate on low power of about 5 to 6 milliamps. A typical LED useful for practice of this invention is manufactured by Radio Shack as Model No. 276-087.

Figure 7:
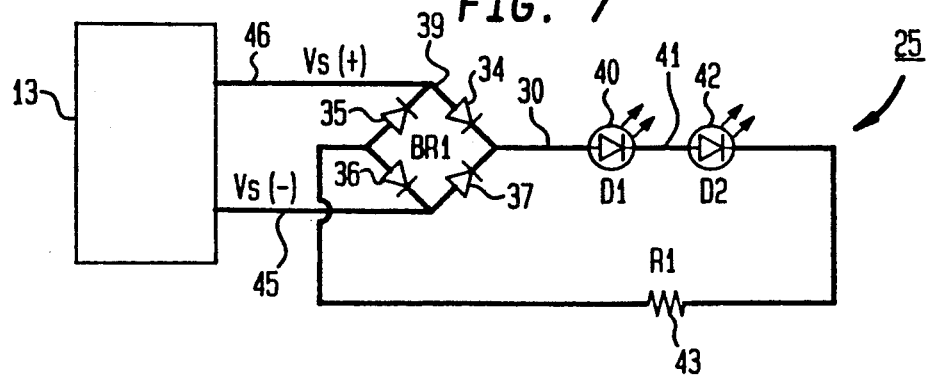
FIG. 7 is a schematic diagram of the indicator circuit for the indicator light system.

FIG. 7 schematically illustrates indicator circuit 25. Leads 45 and 46 are connected between bridge rectifier BR1 39 and an emergency switch 13 to be monitored. Bridge rectifier 39 allows the use of either an alternating current (AC) or direct current (DC) emergency switch 13. Bridge rectifier 39 is preferably a full wave rectifier. Current Vs enters bridge rectifier 39 from lead 46 when Vs is positive and current enters bridge rectifier 39 from lead 45 when Vs is negative. Current Vs will alternate between lead 45 and 46 for AC current. When current Vs enters on lead 46 current Vs flows through diode 34. When current Vs enters on lead 45 current Vs flows through diode 37. A bridge rectifier 39 useful for practice of this invention is manufactured by Radio Shack as Model No. 276-1152.

Current Vs flows from either diode 34 or diode 37 through the electrical connection 30 between bridge rectifier 39 and diode 40. Electrical connection 30 and diode 40 form LED 19. Current Vs flows from diode 40 through electrical connection 41 to diode 42. Electrical connection 41 and diode 42 form LED 20. Current Vs flows from diode 42 through resistor 43 and back to bridge rectifier 39. Current Vs flows through diode 36 when current Vs is negative and through diode 35 when current Vs is positive. Current Vs also flows back to the power supply of emergency switch 13 through either lead 45 or lead 46. With the above-described current flow, LEDs 19, 20 of indicator circuit 25 will light.

Preferably, resistor 43 is formed of a 1.5 kohm and 5.6 kohm resistor wired in series to provide 7.1 kohms. Resistors 43 useful for practice of this invention are manufactured by Radio Shack as model nos. 276-025 providing 1.5 kohm and 276-301 providing 5.6 kohm.

Figure 8:
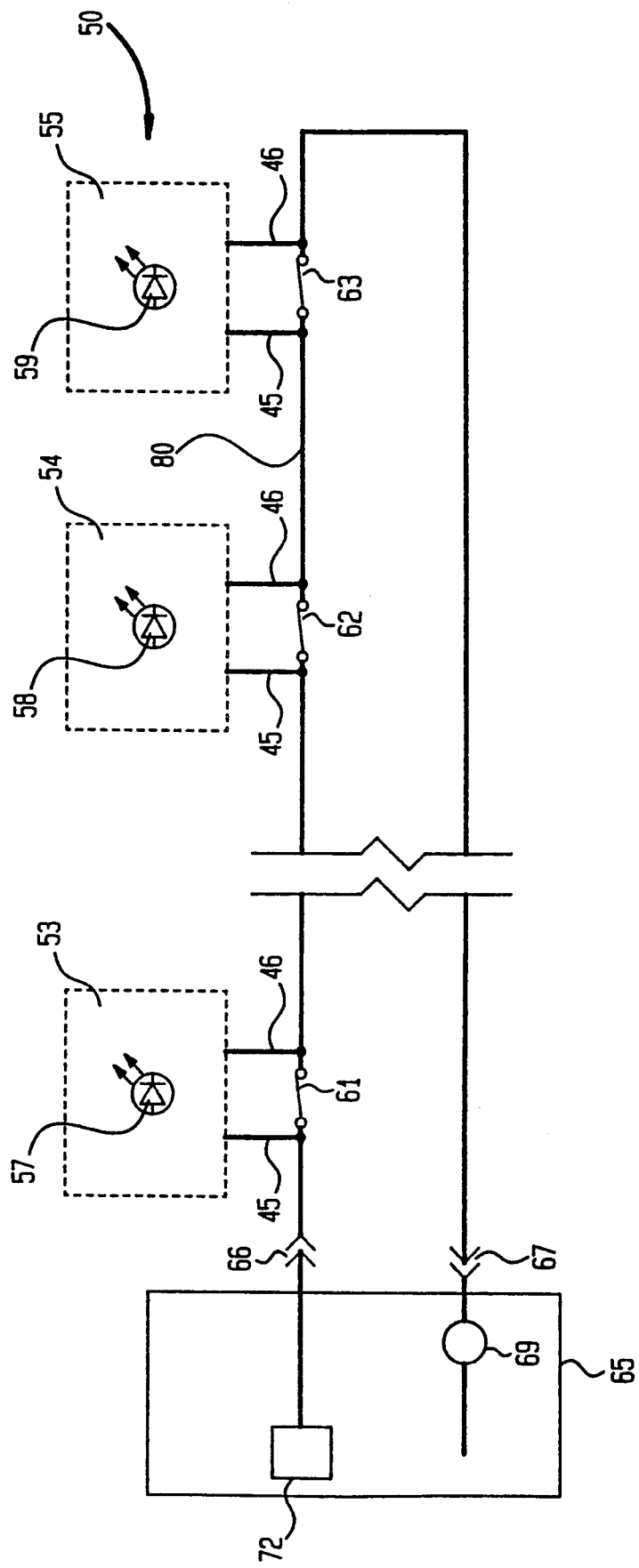
FIG. 8 is a schematic diagram of the indicator light system connected to emergency stop switches during operation of the conveyor belt.

FIG. 8 illustrates a plurality of indicator light systems 53, 54 and 55 which are each the same as indicator light system 10 described above. LEDs 57, 58 and 59 are the same as LED 19. LED 20 is not shown in FIG. 8. Emergency switches 61, 62 and 63 are connected to belt controller 65. Belt controller 65 applies power to conveyor 11 for rotation of the belt unless at least one of emergency switches 61, 62 and 63 is tripped.

In FIG. 8, emergency switches 61, 62 and 63 are closed. Current flows from power supply 72 to electrical connection 66, through emergency switches 61, 62 and 63 and returns to belt controller 65 through electrical connection 67. Current returned to belt controller energizes flag relay circuit 69. When flag relay circuit 69 is energized, the conveyor belt is rotated.

Figure 9:
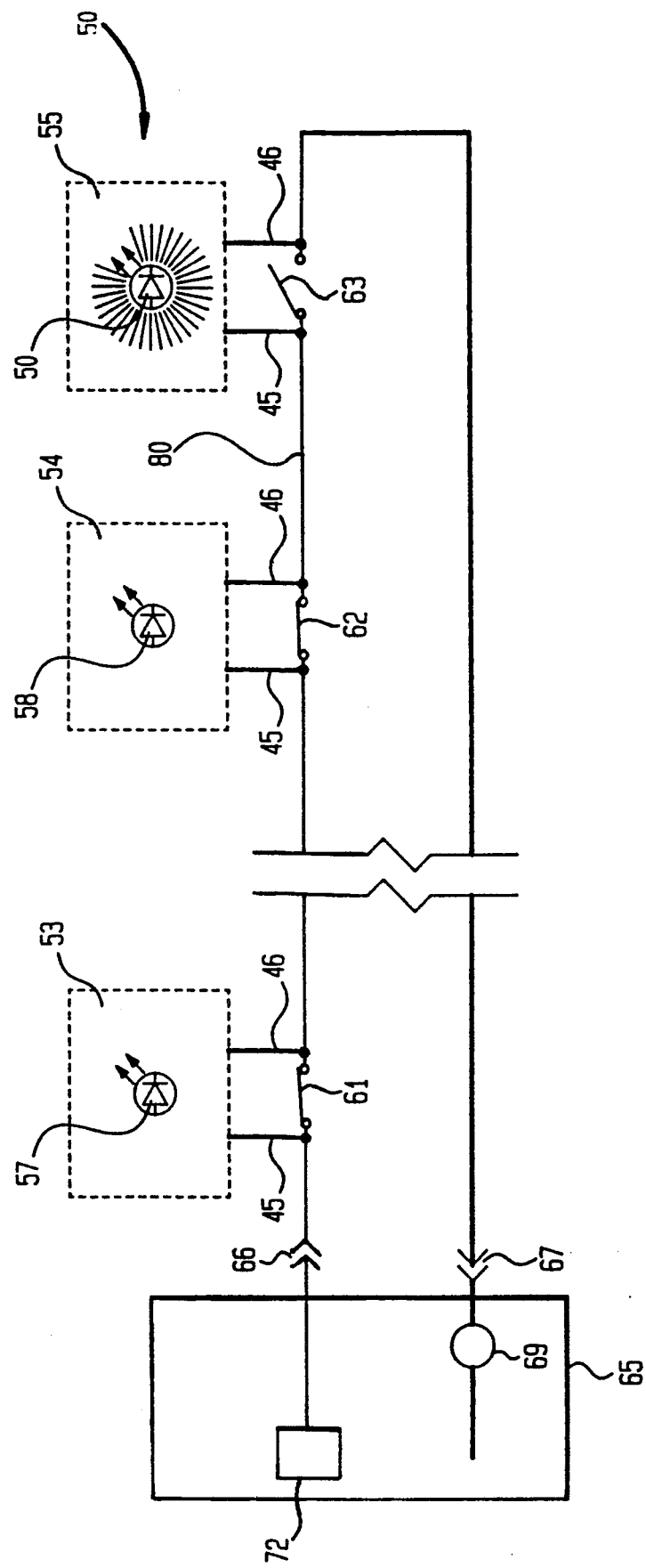
FIG. 9 is a schematic diagram of the indicator light system connected to emergency stop switches during an emergency situation.

FIG. 9 shows emergency switch 63 in an open position and emergency switches 61 and 62 in a closed position. Emergency switch 63 diverts current from electrical connection 80 to indicator light system 55. Preferably, when switch 63 is open all current flows to switch 63 and current will not flow to flag relay circuit 69. In the alternative, small amounts of current may flow to flag relay circuit 69. However, the small amount of current is lower than the amount needed for flag relay circuit 69 to remain energized or to become energized if flag relay circuit 69 is not already energized. Preferably, the small amount of current is about less than 30 milliamps. An insignificant amount of current can also flow through indicator light systems 53 and 54. However, this insignificant amount of current flowing through indicator light systems 53 and 54 will not illuminate LEDs 57 and 58.

In an alternate embodiment, more than one of switches 61, 62 and 63 can be in an open position. In this embodiment, respective LEDs 57, 58 or 59 corresponding to an emergency switch in an open position will receive current and be illuminated. Brightness of the illuminated LEDs is reduced because of the reduced amount of current to the LED.

Preferably, indicator light systems 53, 54 or 55 draws approximately 5.9 mamp on flag relay circuit 69. Indicator light systems 53, 54 or 55 can operate with an increase or decrease of up to 50% in supply voltage. Preferably, flag relay circuit 69 operates at 40 volts.

Figure 10:
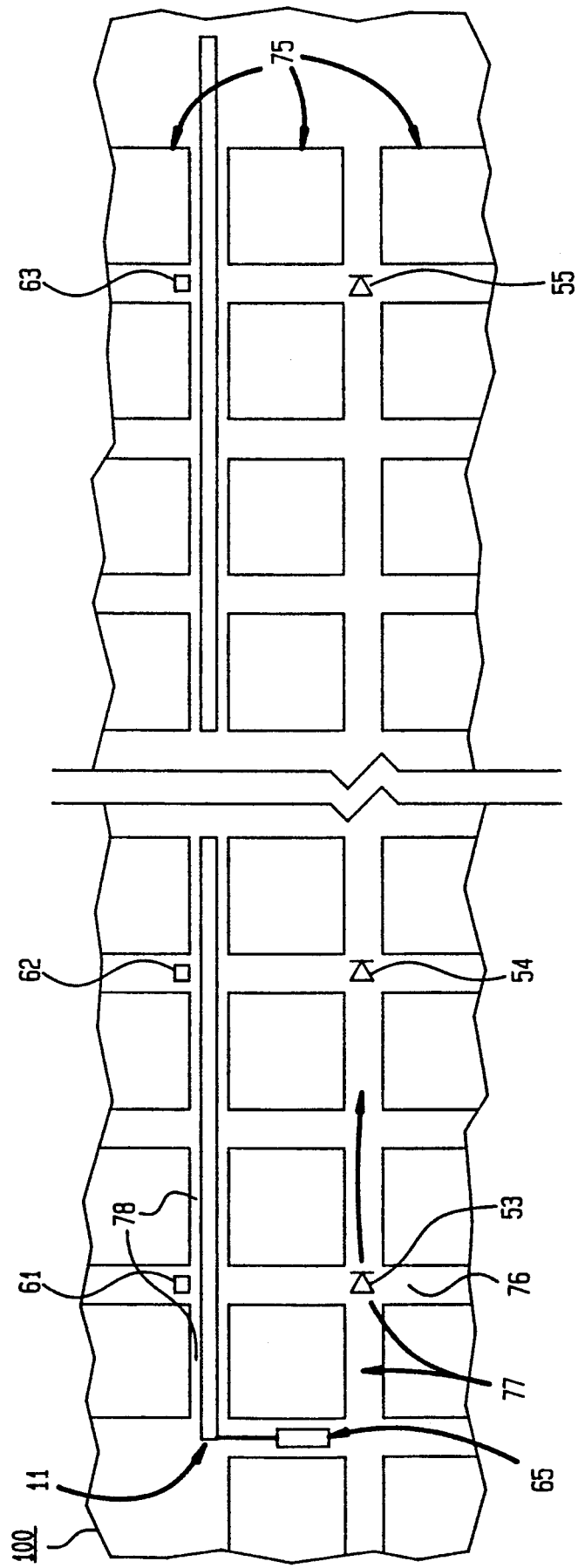
FIG. 10 is a top plan view showing the positioning of the light indicator system in a mine.

FIG. 10 illustrates a plan view of indicator light system 10 used in mine 100. Conveyor 11 is located in tunnel 78. Tunnel 77 is arranged parallel to tunnel 78. Tunnel 77 is used for travel of mine personnel. Tunnels 76 are extended perpendicular through tunnels 77 and 78 for interconnecting tunnels 76, 77 and 78. Preferably, tunnels 76, 77 and 78 are drifts cut through the rock of the mine leaving pillers of rock 75 to support the ground above the mine.

Preferably, tunnel 78 is about 100 feet away from tunnel 77 and each of the tunnels are 100 feet from an adjacent perpendicular tunnel 76. Emergency switches 61, 62 and 63 are positioned in tunnel 78 adjacent conveyor 11. Indicator light systems 53, 54 and 55 are mounted in tunnel 77. Preferably, indicator light systems 53, 54 and 55 are located along the belt at 500 foot intervals. If an emergency switch 61, 62 or 63 is tripped, mine personnel travelling in a vehicle in tunnel 77 can see the corresponding illuminated light indicator system 53, 54 or 55 and determine which emergency switch has been tripped without getting out of the vehicle. Preferably, a mine vehicle travels at a speed of about 20 miles per hour. All of the emergency switches located along conveyor 11 can be checked in about three minutes.

The present invention has the advantage of visually indicating a tripped emergency switch at a distance from the conveyor. Accordingly, a tripped emergency switch can be quickly identified and reset by mining personnel. Further, the present invention has the advantage of being powered by the belt conveyor and, therefore does not use a separate power source. The present invention also operates at low power. Finally, the present invention also has the advantage of having low cost.

While the invention has been described with reference to the preferred embodiment, this description is not intended to be limiting. It will be appreciated by those of ordinary skill in the art that modifications may be made without departing from the spirit and scope of the invention.

I claim:

1. A light indicator system comprising a plurality of lights positioned at various locations along the length of a conveyor for expeditiously locating in emergency situation of the conveyor, said conveyor being connected to an emergency switch for each indicator light, said emergency switch indicating said emergency situation of said conveyor, said system comprising:

an indicator circuit connected to each of said emergency switches, said indicator circuit comprising a bridge rectifier which connects said indicator circuit to an emergency switch, and being activated when said emergency switch indicates said emergency situation, a resistor connected in series with said bridge rectifier and light means comprising at least one light emitting diode connected to said at least one indicator circuit, wherein said light means is illuminated when said emergency switch indicates said emergency situation.

2. The light indicator system of claim 1 further comprising a housing for housing said indicator circuit, said housing including a top surface and at least one side surface, said at least one side surface extending upwardly above said top surface and having at least one hole therein.

3. The light indicator system of claim 2 further comprising at least one indicator integrated circuit board for each of said indicator circuits.

4. The light indicator system of claim 3 wherein said indicator integrated circuit board is mounted inside said housing with a sealing compound.

5. The light indicator system of claim 4 wherein said conveyor is housed in a conveyor tunnel and said indicator circuit is housed in a vehicle tunnel.

6. The light indicator system of claim 5 wherein one of said light emitting diodes is attached to one side of said indicator integrated circuit board and another one of said light emitting diodes is attached to the other side of said indicator integrated circuit board.

7. The light indicator circuit of claim 6 wherein said housing is transparent.

8. The light indicator circuit of claim 6 housing wherein one of said light emitting diodes is attached to a first LED integrated circuit board and another one of said light emitting diodes is attached to a second LED integrated circuit board, said indicator integrated circuit board being positioned between said first and second LED integrated circuit board, said light emitting diodes protruding through said housing.

9. A method for expeditiously locating an emergency situation of a conveyor, using a plurality of indicator lights positioned at various locations along the length of the conveyor, said conveyor including an emergency switch attached thereto for indicating said emergency situation of said conveyor, said method comprising:

activating an indicator circuit comprising a bridge rectifier that connects said indicator circuit to said emergency switch through a resistor connected in series with said bridge rectifier when said emergency switch indicates said emergency situation, said indicator circuit including a light means comprising a light emitting diode, and illuminating said light means in response to said activated indicator circuit.

10. The method of claim 9 further comprising the step of:

mounting said indicator circuit in a housing, the top of said housing including an upwardly extending surface, having holes therein.

11. The method of claim 10 wherein said conveyor is housed in a conveyor tunnel and said light indicator circuit is mounted in a roadway tunnel.

* * * * *